United States Patent [19]

Lane et al.

[11] 4,272,390
[45] Jun. 9, 1981

[54] HYDRATED CACL₂ REVERSIBLE PHASE CHANGE COMPOSITIONS WITH NUCLEATING ADDITIVES

[75] Inventors: George A. Lane; Harold E. Rossow, both of Midland, Mich.

[73] Assignee: The Dow Chemical Company, Midland, Mich.

[21] Appl. No.: 90,704

[22] Filed: Nov. 2, 1979

Related U.S. Application Data

[63] Continuation-in-part of Ser. No. 2,828, Jan. 12, 1979, abandoned.

[51] Int. Cl.³ ............................................... C09K 5/06
[52] U.S. Cl. .................................................... 252/70
[58] Field of Search .................. 126/400; 165/104 S, 165/104 M, DIG. 4, DIG. 17; 252/67, 70

[56] References Cited

U.S. PATENT DOCUMENTS

| | | | |
|---|---|---|---|
| 2,677,664 | 2/1951 | Telkes | 252/70 |
| 2,706,716 | 12/1952 | Howe et al. | 252/70 |
| 4,189,394 | 2/1980 | Schroder et al. | 252/70 |

FOREIGN PATENT DOCUMENTS

| | | | |
|---|---|---|---|
| 2550106 | 5/1976 | Fed. Rep. of Germany | 252/70 |
| 50-90582 | 7/1975 | Japan | 252/70 |
| 50-90585 | 7/1975 | Japan | 252/70 |
| 51-43387 | 4/1976 | Japan | 252/70 |
| 51-70193 | 6/1976 | Japan | 252/70 |
| 51-76183 | 7/1976 | Japan | 252/70 |
| 51-126980 | 11/1976 | Japan | |
| 53-19183 | 2/1978 | Japan | 252/70 |
| 568669 | 9/1977 | U.S.S.R. | 252/70 |

OTHER PUBLICATIONS

Yoneda et al., "Eutectic Mixtures for Solar Heat Storage", *Solar Energy*, vol. 21, 1978, pp. 61–63.
Public Disclosure, NSF/RANN Contract No. NSF-C906.

*Primary Examiner*—Harris A. Pitlick

[57] ABSTRACT

A reversible liquid solid phase change composition comprising hydrated $CaCl_2$, and one of the group of $BaI_2$, $BaSO_4$, and/or $BaO$, added to the composition in an effective amount to suppress supercooling of the $CaCl_2$ liquid phase.

10 Claims, No Drawings

HYDRATED CACL₂ REVERSIBLE PHASE CHANGE COMPOSITIONS WITH NUCLEATING ADDITIVES

CROSS-REFERENCE TO RELATED APPLICATION

This application is a continuation-in-part of application Ser. No. 002,828, filed Jan. 12, 1979 now abandoned.

FIELD OF THE INVENTION

The invention relates to reversible liquid/solid phase change compositions. More particularly, the invention relates to hydrated calcium chloride phase change compositions containing additives to modify the supercooling properties of the $CaCl_2$ liquid phase.

BACKGROUND OF THE INVENTION

Calcium chloride hexahydrate is in many respects suited for use as a latent heat storage medium. The material in substantially pure form undergoes a liquid/solid phase transition at about 27° C.–30° C. (about 81° F.–86° F.) releasing or alternately absorbing about 46 calories of heat per gram (the latent heat of fusion). The material has particularly been considered for use as an encapsulated heat storage medium for use in solar energy space heating applications. Specific embodiments of such applications, for example, are taught in Report Nos. NSF/RANN/SE/C906/FR/76 1; NSF/RANN/SE/C906/TR/75 1; and ORO-5217-8, all available from the National Technical Information Service, Springfield, Virginia, and herein incorporated by reference. In order to improved the material for such applications, however, there exists a need to develop additives or a series of additives effective to modify the supercooling properties of hydrated calcium chloride compositions, and particularly additives which are highly effective in small amounts such as not to alter the advantageous heat storage properties of the material.

Terms

"Hydrated calcium chloride" means reversible liquid/solid phase change compositions containing from between about 40 to 54 weight percent calcium chloride (on an anhydrous basis), and which apart from the additives hereof, are susceptible to supercooling.

"Supercooling" refers to an inherent discrepancy between the temperature at which freezing initiates and the thawing temperature of a given hydrated calcium chloride composition, when cooled and heated under quiet conditions.

"Additive(s)" includes, in addition to the nucleating additives specified herein, precursors of such additives nondetrimental to the purposes of the invention.

THE INVENTION

The invention is the discovery of a new class of highly active nucleating additives for hydrated calcium chloride compositions. The invention particularly is a composition comprising calcium chloride with water in a ratio to prepare a hydrated calcium chloride phase change composition, and which includes as an additive to such composition, one or more of the group of $BaI_2$, $BaSO_4$, and $BaO$ added in an amount effective to suppress the supercooling properties of the calcium chloride liquid phase. Sufficient of the additive(s) is present in the preferred practice to suppress supercooling to no greater than about 2° C. taken on an averaging basis over repeated cycles.

The effective amount of the additive is determined by testing a given composition over repetitive phase change cycles. Generally, effect can be shown with as little as 0.005 weight percent of the composition comprising an additive hereof, and there is generally no further benefit achieved after about 2.0 weight percent of additive is incorporated into the composition.

The compositions hereof are ideally packaged in individual encapsulating means for use in conjunction with solar heating systems. Exemplary of suitable and known encapsulating means for the heat storage compositions hereof are water impervious foils of plastic/metal laminates. Also, closed cell plastic foams have been suggested in which the heat storage composition may be encapsulated within the cells of the foam structure, as illustrated, for example, in U.S. Pat. No. 4,003,426, incorporated herein by reference. Yet other useful encapsulating means are metal or plastic cans, such as inexpensive aerosol cans; metal or plastic pipe, such as extruded polyethylene pipe; and the like. Further details respecting such encapsulating means are given in Report Nos. ORO/5217-8 and NSF RANN SE C906 FR 76 1, both available from the National Technical Information Service, Springfield, Va. and fully incorporated herein by reference.

EXAMPLE

The data of the table below are generated by preparing hydrated calcium chloride samples of analytical grade components, according to the ratios indicated, and wherein the mixed samples of each specified ratio are placed into a two-ounce glass vial, which is then heated to 50° C. under agitation to achieve a uniform dispersion or admixture. A glass-encased thermocouple is inserted through the cap of each vial to measure temperature changes at the center of each sample prior to, during and after freezing. The cooling temperature is controlled and maintained within the range of about 10° C.–15° C. Sample No. 1, below, is a control sample of analytical grade $CaCl_2$, and since supercooling tendencies prevented the control sample from freezing within the indicated cooling temperature range, further tests at 0° C. are given in the table with respect to this material.

TABLE

| Sample | Additive | Test Cycle #'s | Freeze Initiation Temperature °C. | Freeze Plateau °C. | Supercooling °C. |
| --- | --- | --- | --- | --- | --- |
| 1 | 30.4 g CaCl₂ + 29.6 g H₂O 30.4 g CaCl₂ | none | 1 @ 12° C. 2 @ 0° C. 3 @ 0° C. | — 3° C. 2° C. | No Freezing Partial Freezing 25° C. | — — 23° C. |

TABLE-continued

| Sample | Additive | Test Cycle #'s | Freeze Initiation Temperature °C. | Freeze Plateau °C. | Supercooling °C. |
| --- | --- | --- | --- | --- | --- |
| 2 + 29.6 g H$_2$O 30.4 g CaCl$_2$ | 0.3 g BaI$_2$ | 1-20 | 27.5-29 | 26-28 | none |
| 3 + 29.6 g H$_2$O 30.4 g CaCl$_2$ | 0.06 g BaSO$_4$ | 1-75 75-170 171-281 | — — 26.5-28 | — — 27-28 | 0-3.5 0-5 0-1.5 |
| 4 + 29.6 g H$_2$O | 0.06 g BaO | 1-25 | — | — | 0-3 |

Referring to the Table, the high activity in small amounts of the defined group of additives is particularly pronounced in comparison with the control sample. Thus, in two of the tests relating to the control sample, one at the lower temperature of 0° C., supercooling is not overcome and no complete freezing of the material is thus observed. In a third test, also at the lower temperature of 0° C., complete freezing is accomplished, but only with excessive supercooling of the control composition. In contrast, the small amount of the additives of the invention, where present, change the character of the control such that supercooling is essentially close to elimination or is eliminated entirely.

What is claimed is:

1. A reversible liquid/solid phase change composition comprising hydrated CaCl$_2$, and as a nucleating additive, one or more of BaI$_2$, BaSO$_4$, or BaO, added to the composition in an amount effective to suppress supercooling of the hydrated CaCl$_2$ liquid phase.

2. The composition of claim 1 contained within encapsulating means and having added thereto an amount of one or more of the additives of the defined group effective to suppress average supercooling of the hydrated CaCl$_2$ liquid phase to about 2° C. or less.

3. The composition of claim 2 wherein the additive comprises BaI$_2$.

4. The composition of claim 2 wherein the additive comprises BaSO$_4$.

5. The composition of claim 2 wherein the additive comprises BaO.

6. A method of preparing a hydrated CaCl$_2$ of suppressed supercooling properties, comprising admixing uniformly in such composition as a nucleating additive, one or more of BaI$_2$, BaSO$_4$, or BaO, in an amount effective to suppress supercooling of the hydrated CaCl$_2$ liquid phase.

7. The method of claim 6 wherein an effective amount of one or more of the defined group is added to suppress average supercooling of the hydrated CaCl$_2$ liquid phase to about 2° C. or less.

8. The method of claim 6 using the additive BaI$_2$.

9. The method of claim 6 using the additive BaSO$_4$.

10. The method of claim 6 using the additive BaO.

* * * * *